INVENTOR
ARTHUR THOMAS
BY Sydney L. Page
ATTORNEY

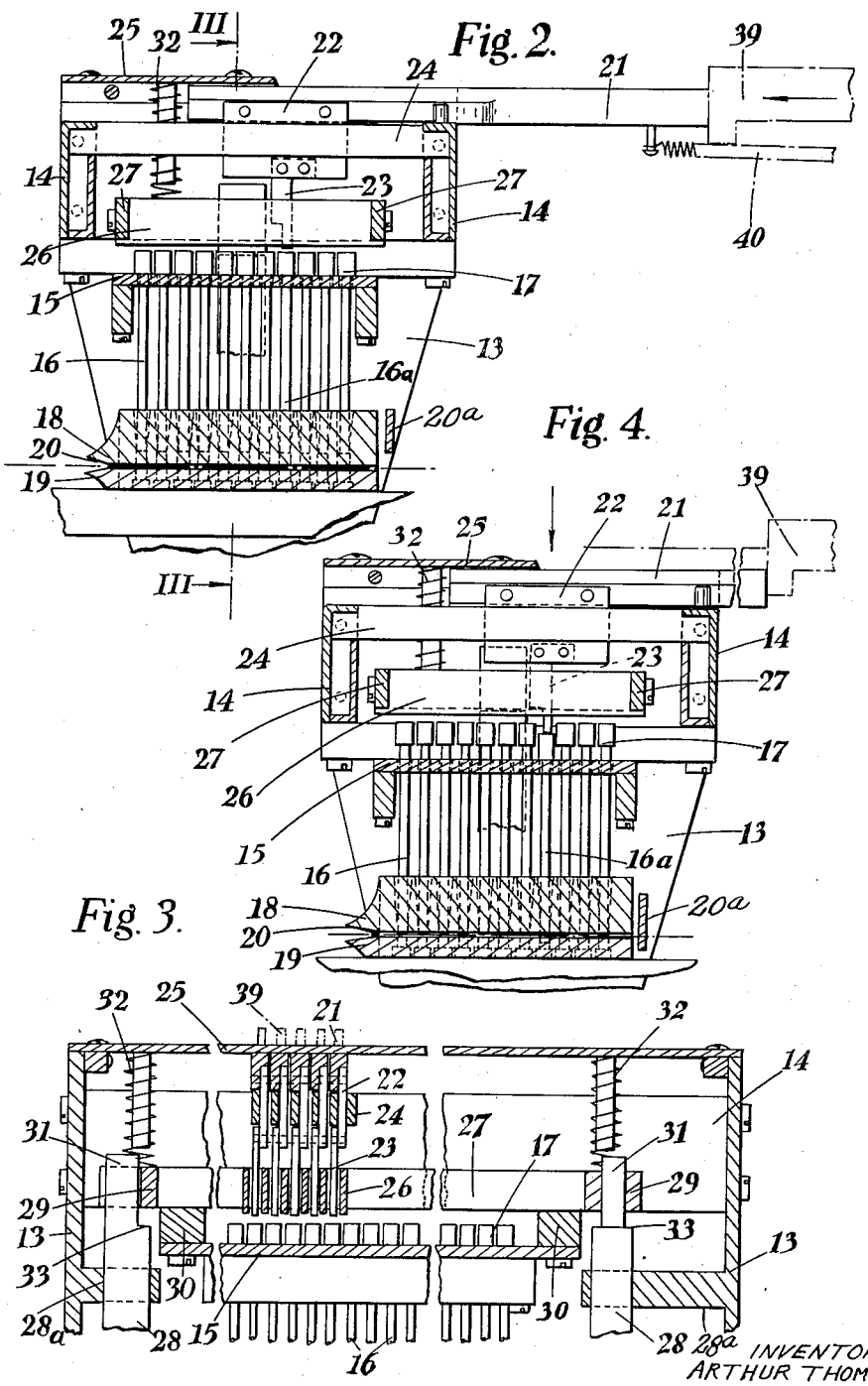

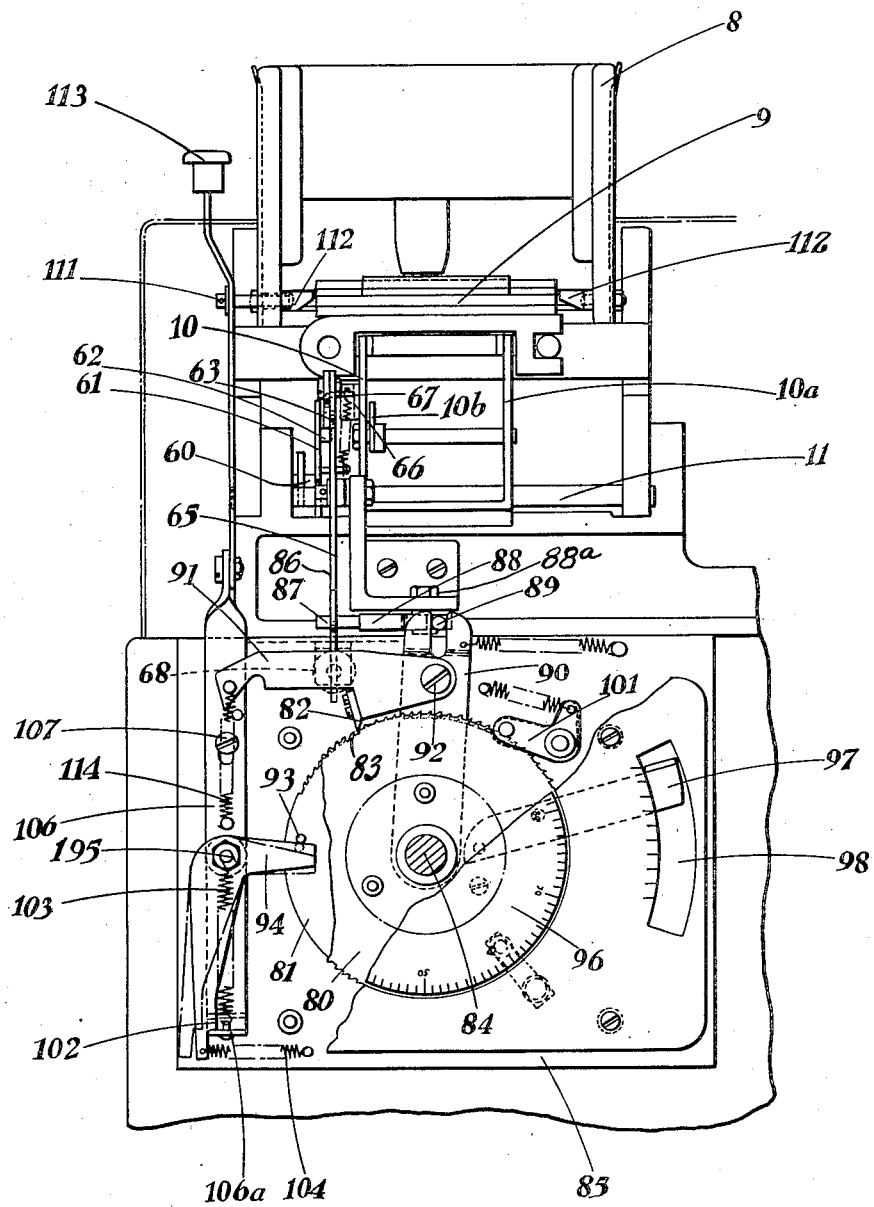

April 27, 1937.  A. THOMAS  2,078,470
MACHINE FOR MAKING RECORDS ON STATISTICAL CARDS
Filed March 4, 1935   8 Sheets-Sheet 6
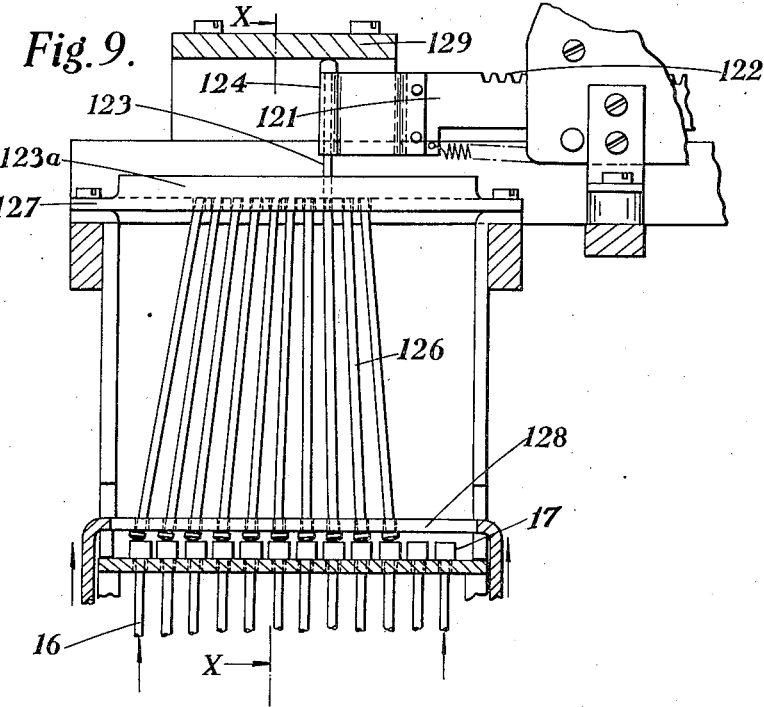
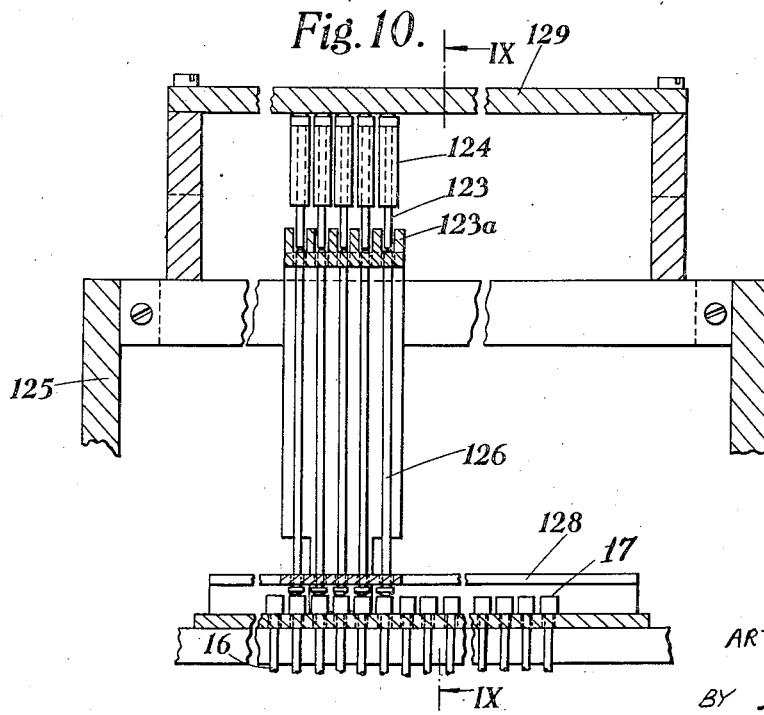
INVENTOR
ARTHUR THOMAS
BY Sydney E. Page.
ATTORNEY April 27, 1937.  A. THOMAS  2,078,470
MACHINE FOR MAKING RECORDS ON STATISTICAL CARDS
Filed March 4, 1935   8 Sheets-Sheet 7
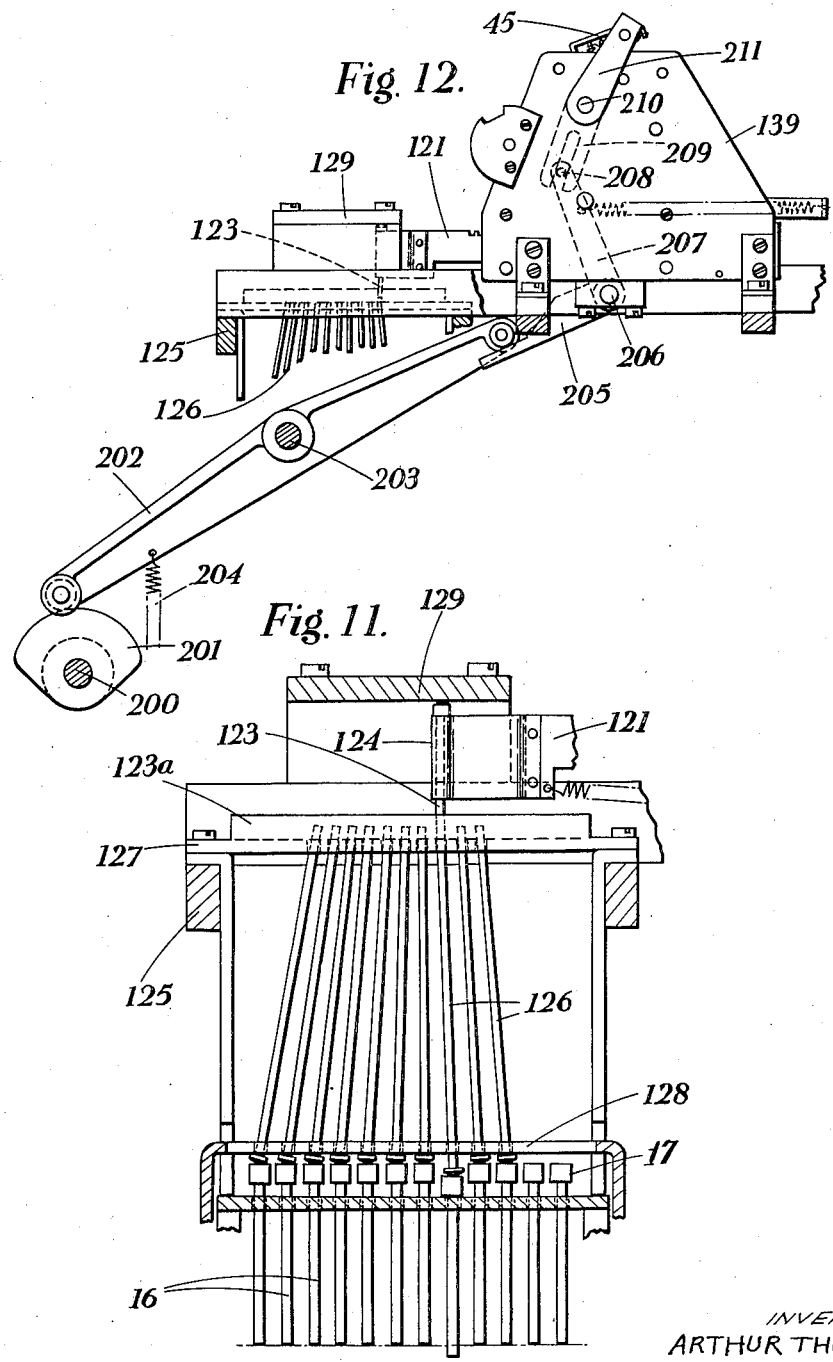
INVENTOR
ARTHUR THOMAS
BY Sydney E. Page
ATTORNEY April 27, 1937.  A. THOMAS  2,078,470
MACHINE FOR MAKING RECORDS ON STATISTICAL CARDS
Filed March 4, 1935   8 Sheets-Sheet 8

INVENTOR
ARTHUR THOMAS
BY *W. A. Sparks*
HIS ATTORNEY

Patented Apr. 27, 1937

2,078,470

UNITED STATES PATENT OFFICE 2,078,470

MACHINES FOR MAKING RECORDS ON STATISTICAL CARDS

Arthur Thomas, Wallington, England, assignor to Powers Accounting Machines Limited, London, England Application March 4, 1935, Serial No. 9,263
In Great Britain March 3, 1934

10 Claims. (Cl. 164—114)

(Granted under the provisions of sec. 14, act of March 2, 1927; 357 O. G. 5)

This invention relates to machines for making records on statistical cards, and has for its object to provide a machine which will automatically produce records representing data in serial or progressive order, such as numbers.

A further object is to provide such mechanism of a simple form, and capable of operating at a high speed.

A still further object of the invention is to provide such a machine in which the feed of cards is automatically stopped after a predetermined number of cards has been fed.

In order to enable the invention to be clearly understood the application thereof to a card perforating machine will now be described by way of example with reference to the accompanying drawings.

In the drawings:—

Fig. 2 is a sectional elevation of a reciprocating frame carrying the punches, the parts being shown in the positions which they occupy when the frame is in its uppermost position;

Fig. 3 is a view in section on the line III—III of Fig. 2;

Fig. 4 is a view similar to that of Figure 3 showing the parts in the positons which they occupy when the frame is in its lowermost position;

Fig. 8 illustrates in elevation the control counter, parts being broken away for clearness;

Fig. 9 shows an alternative arrangement of punch setting mechanism in elevation;

Fig. 10 is a view in section on the line X—X of Figure 9;

Fig. 11 is a view similar to that of Figure 9 showing the punches in operative position; and Fig. 12 is an elevation of an alternative mechanism for actuating the units counter which serves to operate the punch setting mechanism.

Figure 1:
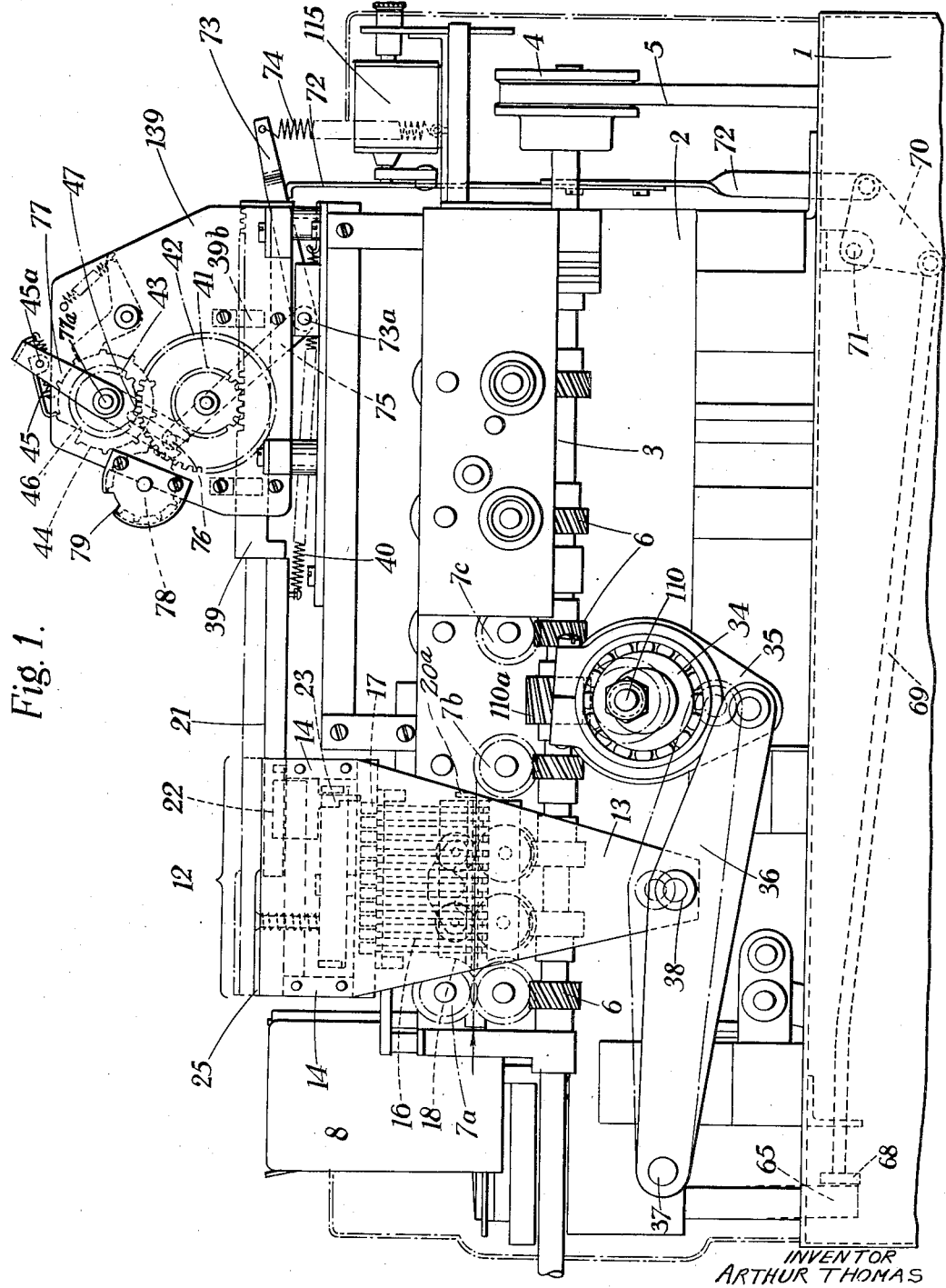
Fig. 1 illustrates in side elevation one construction according to the invention.

Figs. 13 to 16 inclusive are detail views showing the means to sense the presence of a card.

The machine comprises a base 1 on which is mounted a main frame 2 carrying a main shaft 3 driven through a pulley 4 and belt 5 from an electric motor (not shown) housed in the base 1.

The main shaft 3 carries a series of skew gears 6 from which pairs of feed rolls 7a, 7b, 7c are driven for transporting the cards through the machine.

The cards are stacked in a magazine 8 from which they are fed one by one by a picker 9 (Fig. 7) which is reciprocated by a pair of oscillating arms 10, 10a, pivoted on shaft 11.

The arm 10 is connected by a link 10b to an eccentric 10c secured to a shaft 110 driven through skew gears 110a from the main shaft 3.

Mounted to reciprocate vertically in the main frame 2 is a punch carrying frame indicated generally at 12. This frame 12 comprises a pair of side plates 13 connected by cross members 14 and carrying a guide plate 15 for the punches 16.

The punches 16 are arranged in denominational columns and their heads 17 rest on the guide plate 15, their lower ends passing into a die plate 18, which is fixed in the main frame 2 and does not reciprocate with the frame 12. Below this fixed die plate 18 is a second die plate 19 having perforations into which the lower ends of the punches can enter. Between the die plates 18 and 19 is a narrow space 20 (Figs. 2 and 4) in which the card remains during the punching operation.

The card is fed into the space 20 by the feed rolls 7a and is arrested thereon in the known manner by a card stop 20a carried between side plates 13. The card stop is carried by the reciprocating frame 12 and when the latter descends the card stop is in position to arrest the card. When the frame 12 ascends again the card stop is withdrawn and the feed rolls 7b eject the card which is carried to a receptacle (not shown) by the feed rolls 7c.

Mounted to slide along the top of the frame 12 is a series of punch setting slides 21. Each slide 21 has secured to it a plate 22 from which depends a setting finger 23.

The plates 22 pass between guide bars 24 running parallel to the side plates 13 and secured to the cross members 14. The slides 21 are further guided by a plate 25 under which they pass, this plate 25 running across the frame 12 between the side plates 13.

In addition the depending setting fingers 23 pass between guide bars 26 running parallel to the side plates 13 and secured at their ends to cross bars 27.

The frame 12 is guided in its reciprocation by vertical pillars 28 which are fixed in the main frame 2 and pass through holes in bosses 28a of the side plates 13.

The cross bars 27 which unite the guide bars 26 are connected at their ends by bars 29 to form a floating frame which normally rests on members 30 which are secured to the cross members 14 of the frame 12 and in turn serve to carry the punch guide plate 15.

The bars 29 are guided on the upper reduced ends 31 of the pillars 28 and are held against the members 30 by springs 32.

The setting slides 21 move up and down with the frame 12 and the punches 16 and their action is as follows:—

If a setting slide 21 is disposed so that its finger 23 is over a given punch such as the punch 16a in Figure 2 then as the frame 12 descends the slide 21 and its finger 23 descend with it and with the punches 16. As the frame 12 continues to descend the punches engage the surface of the card which at this time is disposed within the space 20. Those punches 16 over which no finger 23 is disposed come to rest on the card and are left behind as the frame continues to descend. The punch 16a, however, cannot move relatively to the frame since such relative movement is prevented by the finger 23 which is above the punch 16a. The further descent of the frame 12, therefore, forces the punch 16a through the card, thereby producing the required perforation therein.

Figure 4 shows the relative positions of the punches 16 which have not passed through the card, and of the punch 16a which has passed through the card. It will be seen that the finger 23 serves as an abutment for the punch 16a, the thrust being taken by the plate 25 which prevents the slide 21 from tilting.

The punches which have been lifted relatively to the guide plate 15 are positively returned to their normal position by the guide bars 26 during the rise of the frame 12. In order to bring this operation about the pillars 28 are provided with shoulders 33 and during the descent of the frame 12 the floating frame formed by the bars 27 and 29 follows its descent until the bars 29 come to rest on the shoulders 33 just before the punches strike the card.

Thus the heads 17 of those punches which have been held up by the card will remain just below the guide bars 26 so that when the frame 12 begins to rise the pins 16 will be unable to rise with it until the members 30 have again engaged the bars 29 and commenced to lift the floating frame including the guide bars 26.

The frame 12 is reciprocated by eccentrics 34 secured to the shaft 110. In Figure 1 only one eccentric 34 can be seen, the other being at the opposite side of the machine. The strap 35 of each eccentric 34 has pivoted to it a link 36 pivoted at 37 to the frame 2 and at 38 to the lower end of a side plate 13 of the frame 12.

The machine according to the invention is intended to punch successive cards with holes representing numbers in serial order and means is provided for positioning the setting slides 21 automatically to effect this result.

In the machine shown in the drawings there are five setting slides 21, one for the units denomination, one for the tens denomination and so on up to the tens of thousands denomination.

In the drawings means is shown for setting all these slides automatically but it may be preferred only to set the units and tens slides in this way, leaving the remainder to be set by hand.

Setting racks 39 (Fig. 1) which are slidably mounted in a fixed frame 139 abut against the ends of the slides 21, being pulled against them by springs 40.

The teeth of each rack 39 engage with a gear wheel 41 having fixed to it a co-axial gear wheel 42 engaging with a third gear wheel 43 having fixed to it a ratchet wheel 44. There is a ratchet wheel 44 for each denominational column of punches 16 which are required for punching serial numbers. The first of these ratchet wheels is the units wheel, the second is the tens, the third is the hundreds and so on.

It is not normally required to punch serial numbers beyond five figures. It will be obvious that the sixth figure would only change after 100,000 cards. Thus with a machine running at a speed of two hundred cards per minute, this change would only take place after every eight and a half hours running, and the operations would be more economically handled by first separating the cards into batches.

All the ratchet wheels 44 are operated by a common stepped pawl 45 and, with the exception of the wheel of highest denomination all these ratchet wheels have a deep tooth 46 in the nine position, so that when any wheel reaches the nine position the next operation of the pawl 45 causes the next higher wheel to be advanced one tooth space, thereby effecting a tens transfer operation as is well known in the art.

Since each ratchet wheel 44 is connected through the aforesaid gear wheels 41, 42, 43 and rack 39, to its corresponding punch setting slide 21, each advance of the ratchet wheel 44 will advance the corresponding setting slide 21 one step, which corresponds to the pitch of the punches 16. If when the setting slide 21 is in the 9 position, it has imparted to it a further movement, it is, according to the invention, automatically released from the ratchet wheel 44 and permitted to fly back to the zero position under the action of the spring 40. To this end the gear wheel 43 which is co-axial with the ratchet wheel 44, is formed without teeth over a part 47 of its circumference, this part being reached by the co-operating gear wheel 42 when the corresponding setting slide 21 is advanced beyond the 9 position.

Figure 5:
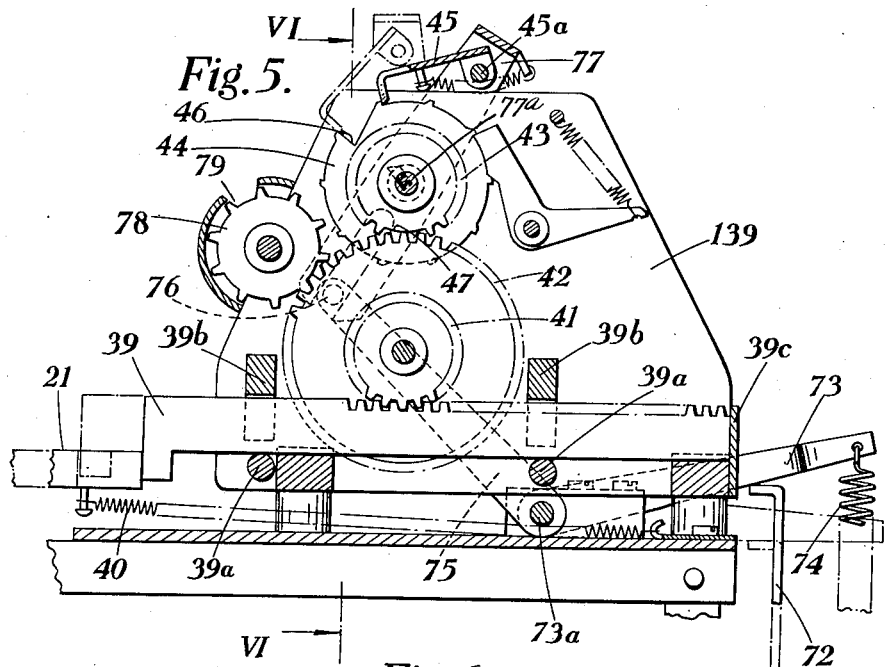
Figure 5 is a view in elevation of a units counting device serving to actuate the setting mechanism for the punches.
Figure 6:
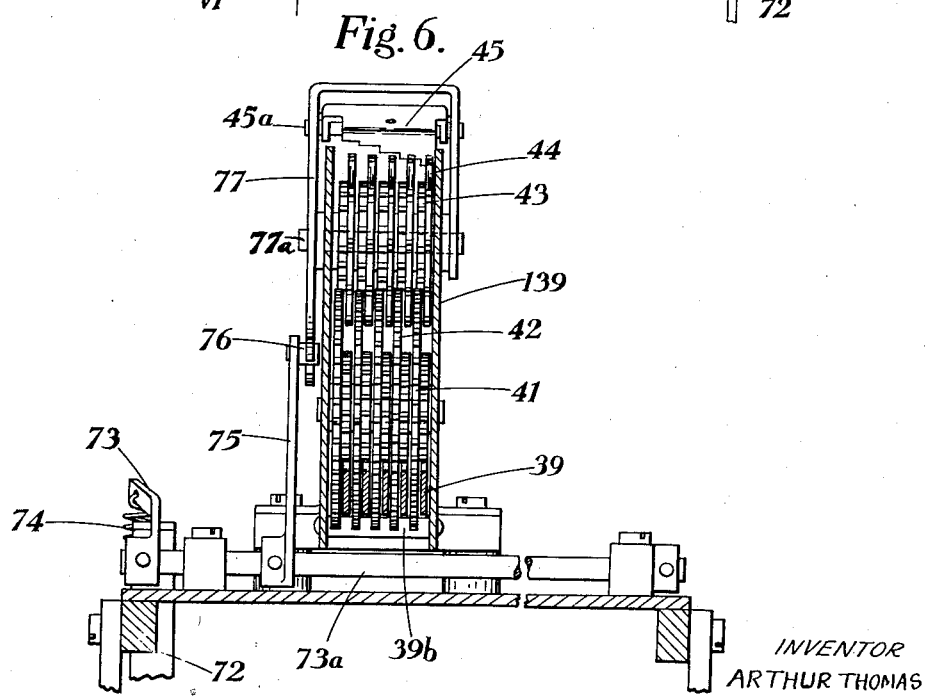
Fig. 6 is a view in section on the line VI—VI of Figure 5.

Thus, during the advance of the ratchet wheel 44 from the 9 to the 0 position, the part 47 of the associated gear wheel 43 which is without teeth comes opposite the associated intermediate gear wheel 42 which is thereby freed from the action of the ratchet 44, and consequently the spring 40 pulls the setting slide 21 back to zero, this movement being arrested by a stop 39c (see Fig. 5) against which the corresponding rack 39 abuts when the associated setting slide 21 is in the zero position.

The length 47 of the circumference of the gear wheel 43 which is formed without teeth is such that when it is in the zero position, the intermediate gear wheel 42 which is connected to the rack 39 is free to move without its teeth touching the teeth of the mutilated wheel 43.

The rack 39, is therefore, released during the movement of the ratchet wheel 44 from 9 to 0, and the next movement of the pawl 45 advances the setting slide 21 from the 0 to the 1 position.

The ratchet wheels 44 are operated during one quarter of the machine cycle and therefore the slide 21 has just over three quarters of the cycle in which to return.

From the foregoing it will be seen that as the pawl 45 operates the ratchets 44 step by step the setting slides 21 are advanced one unit at a time and when any slide reaches the 9 position the next movement returns it to 0. Thus, if the slides all commence their movement from the 0 position, then after, say, 123 operations of the pawl, the units slide 21 will have its finger 23 over the number 3 punch; the tens slide will be over the number 2 punch, and the hundreds slide over the number 1 punch.

It will be understood that it is necessary to advance the punch setting slides 21 one unit for each card fed to the punching mechanism as distinct from each cycle of the machine.

In order to ensure that this operation will occur, the actuation of the feed pawl 45 for the units counter described above is placed under the control of a sensing pin 50 (see Fig. 7) which ascertains at each machine cycle whether a card is in the punching mechanism or not.

This sensing pin 50 is reciprocated under the die plates 18, 19, between which the card passes and which are provided with holes for the passage of the pin 50. The pin is moved upwardly by a spring 51 and is drawn down positively by a cam 52 engaging a roller 53 carried on a member 54 from which the pin 50 projects, this member 54 being guided for vertical reciprocation in a part of the fixed frame 2.

Thus when there is a card between the die plates 18, 19, this pin 50 will fail to rise whereas when there is no card present the pin will rise to its fullest extent.

The lower end of the reciprocating member 54 which carries the pin 50 is pivoted to a lever 55 secured to a shaft 56 to which is also secured an arm 57 connected by a pin in slot connection 58 to a lever 59 pivoted between its ends on a shaft 60.

The other end 61 of the lever 59 carries a laterally projecting pin 62 on which rests an interposer 63 in the form of an arm freely pivoted at 64 to a lever 65 which when rocked actuates the units counter pawl 45 through mechanism hereinafter described.

Extending laterally from the interposer 63 is a projection 67 which, when the interposer 63 is in its lower position (Figure 7) is in the path of a lateral projection 66 on the arm 10 which actuates the picker 9.

When the interposer is in this lower position clockwise movement of the arm 10 brings the projection 66 into engagement with the projection 67 on the interposer 63 whereby the lever 65 is rocked in a clockwise direction about its pivot 65a and actuates the units counter pawl 45 by means of elements 69, 70, 72, 73 and 75 (Fig. 1).

Figure 7:
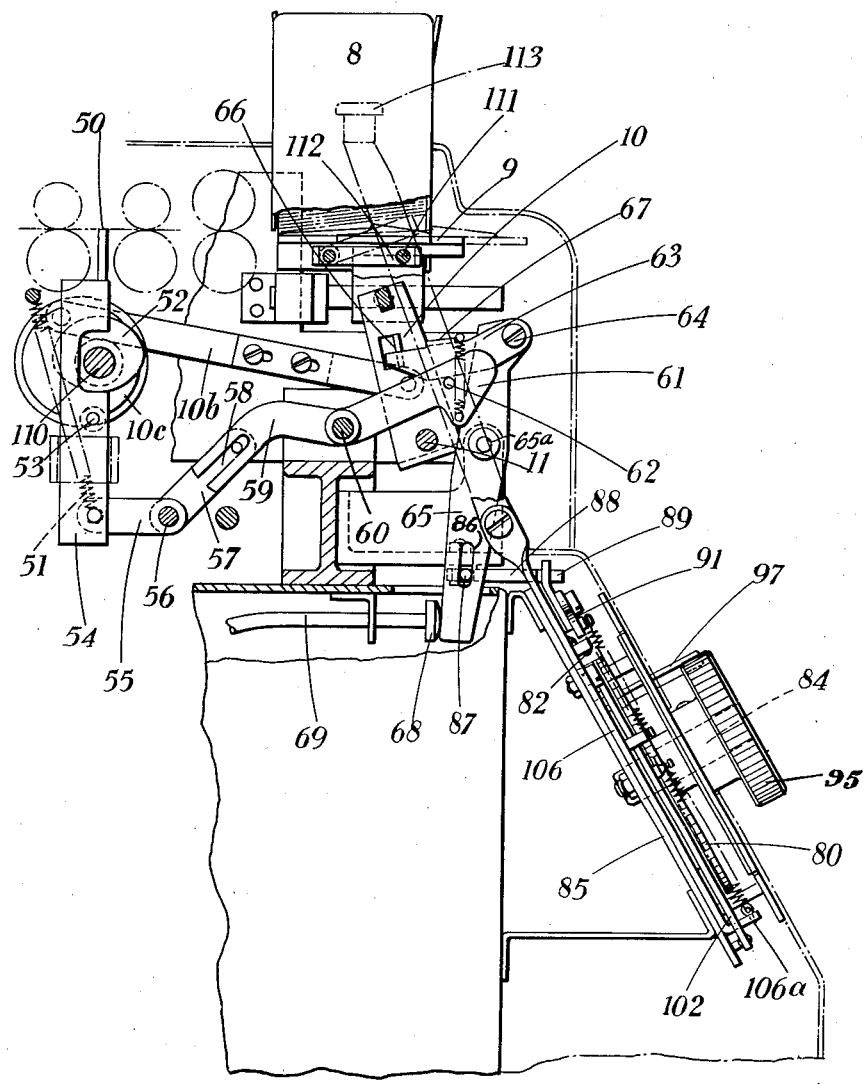
Fig. 7 illustrates details of the mechanism for operating a control units counter serving to arrest the feed of cards after a predetermined number of cards has been punched.

In Figure 7 the sensing pin 50 is shown as held in its lower position due to a card being between the die plates 18, 19, and accordingly the pin 62 on the lever 59 is also in its lower position whereby the interposer 63 is permitted to fall to its lower or operative position.

As already explained when there is no card between the die plates the pin 50 rises. Consequently the lever 59 is rocked in a counter clockwise direction and lifts the interposer 63 so that the lateral projection 66 is above the path of the projection 67. Accordingly the lever 65 and therefore the counter pawl 45 is not actuated when there is no card on the punching mechanism.

The lever 65 bears at its lower end against the head 68 of a rod 69 (Figures 1 and 7) pivoted at its other end to a bell crank plate 70, pivoted to the machine frame at 71.

Also pivoted to this plate 70 is a rod 72 guided for vertical reciprocation in the machine frame, the upper end of which lies under an arm 73 secured to a cross shaft 73a in the frame 139 of the punch setting units counter and pulled downwardly by a spring 74.

Secured to the shaft 73a is a further arm 75 connected by a pin in slot connection 76 to a lever 77 pivoted at 77a to the frame 139 and carrying the actuating pawl 45 which is pivoted to it at 45a.

This mechanism transmits to the pawl 45 the rocking movements of the lever 65.

The operation of the counting wheels 44 is arranged to take place while the setting slides 21 are rising immediately after the punches 16 are withdrawn from the card, and it is so arranged that the new setting is made by the time the reciprocating frame 12 reaches the top of its stroke, thus ensuring that the setting is complete before the next punching stroke of the machine.

In operations requiring serial punching of cards, it is sometimes necessary to punch such figures in conformity with a serial number which is already printed on the card. In such cases it is very necessary to keep a very close check on the operations at all stages, and in one method used effectively the cards are dealt with in separate packs of 100 or 1000 cards.

During printing the cards can be separated into these batches. Then, as a next operation, each batch is punched with the numbers common to the batch. It will be seen that in 100 batches all figures above the first two columns will be common to the batch, and in a 1000 batch, all above the first three figures will be common. On this operation these common figures would be set by hand for each batch, and the number checked by recording on a counter the number of cards. The serial number device would then only require to control the last two or three columns according to the size of the pack.

The most important feature of this scheme is that at the end of each batch the last card can be examined and checked with the recording counter to see that the printed number agrees with the perforated record.

The foregoing description assumes that the cards are kept in their separate packs which are dealt with independently. Now in order to effect the same result without the necessity of separating the cards into packs, according to the invention a separate counting device is used which controls the number of cards which pass at any one setting.

With the aid of this counting device the whole pack of cards can be handled. The cards are put in the magazine of the machine with say No. 0 first. Assuming it is required to handle the cards in batches of 100, the control counter can be set to 100, and the machine will then feed exactly 100 cards and stop on No. 99. The third figure is set by hand to 1, the machine restarted, and Nos. 100 to 199 will be punched, the machine then stopping automatically for another setting.

As by this method the cards are checked at every 100, errors of any kind are insured against and as the hand setting required for each 100 batch is only in respect of one figure, it makes a very economical and efficient method.

The counting unit which controls the stopping of the machine will now be described.

This control counter comprises a number of toothed wheels, conveniently two, of which one 80 has 100 teeth, while the other 81 has only 10 teeth of a pitch equal to those on the other wheel. A common pawl 82 is provided to actuate these wheels, and the wheel with the 100 teeth is provided with a deep tooth 83 at the 99 position so that the passage from 99 to 0 causes the pawl to advance the second wheel one step giving a reading of 100.

The actuating pawl 82 for the wheels of this control counter is carried by an arm 91 pivoted at 92 to an arm 90 rotatably mounted about the shaft 84 on which the counter wheels 80 and 81 are freely mounted, this shaft 84 being carried between supporting plates 85.

The pawl 82 is actuated by the same lever 65 which actuates the pawl 45 for the punch setting counter so that the control counter wheel 80 is advanced one step, only when a card is actually fed to the punches.

To this end the lever 65 is slotted at 86 and a bell crank plate 88, pivoted at 88a carries a pin 87 extending into the slot 86 and also a further pin 89 extending into a slot in the upper end of the arm 90.

Thus each time the lever 65 is rocked the bell crank plate 88 is rocked also, which in turn rocks the arm 90 to operate the pawl 82 for the control counter.

The second wheel of the control counter which may be referred to as the hundreds wheel 81 carries a pin 93 which, when the hundreds wheel reaches the 0 position abuts against one arm 94 of a bell crank pivoted at 195 so that when the other wheel 80 next reaches the 0 position the next stroke of the pawl 82 will advance the 100 wheel and cause a rocking movement of the bell crank 94. This rocking movement of the bell crank is transmitted to mechanism which interrupts the card feed.

The two wheels 80 and 81 of this counter are provided with means whereby they may be set to any desired number, for example, if it is desired that 275 cards shall pass through the mechanism before the card feed is stopped, then the first wheel 80, i. e. that with 100 teeth is set to such a position that 75 steps of the operating pawl will bring this first wheel to the 0 position, while the 100 wheel 81 is set so that 2 steps of this wheel have to be effected before it reaches its 0 position.

With this setting the first 74 steps of the pawl 82 will bring the first wheel 80 to the 99 position. Then as it travels from the 99 to 0 position the 100's wheel 81 will turn one tooth.

Another 200 steps of the pawl 82, equal to two revolutions of the first wheel 80, will cause two further steps of the hundreds wheel 81, the last one bringing about a rocking of the bell crank 94 to interrupt the card feed.

The wheel 80 is provided with a setting knob 95 and a graduated disc 96 bearing numbers from zero to 99, while the wheel 81 carries a setting lever 97 projecting through a slot 98 at the side of which are graduations bearing numbers from 0 to 9, these representing hundreds.

Each wheel 80, 81, is provided with a detent pawl 101.

In order to interrupt the card feed the bell crank 94 referred to above is provided with a shoulder 102 serving to hold down a slide 106 which tends to rise under the action of a spring 103, but is held down by the bell crank 94 of which the shoulder 102 engages a lug 106a on the slide, the bell crank 94 being pulled in a counter clockwise direction by a spring 104. This slide 106 is connected at 111 to a stirrup member 112 which lies underneath the cards in the magazine 8, but when the slide 106 rises, the stirrup member 112 also rises, thereby lifting the cards off the picker 9 so that the feeding is interrupted.

The slide 106 may also be connected by mechanism (not shown) to a switch controlling the supply of power to the motor which operates the machine so as to open the switch when said slide rises.

It will be seen that the means described above for lifting the cards off the picker 9 results in an instantaneous interruption of the card feed even if the picker makes a few more reciprocations after the motor has been switched off. It would clearly be of no value merely to stop the motor since it is desired to punch a definite number of cards and no more. For this reason the above means is provided for instantaneously interrupting the card feed by lifting the cards off the picker 9.

After the slide has thus risen, it can be reset by depression of a key 113 which in turn depresses the slide which is then latched again by the bell crank 94. The slide is also connected by a spring 114 to the arm 91 carrying the operating pawl 82 for the control counting wheels 80 and 81 so as to lift this pawl off the wheels when the slide rises, thereby permitting the wheels to be reset if desired to another number.

Where the rise of the slide 106 switches off the motor, depression of the slide by the key 113 also serves to switch the motor on again.

When using this mechanism to control the punching of cards in batches of, say 100, as described above, the card counter can be set so that it will in effect reset itself after each 100 cards.

For this purpose the hundreds wheel 81 would be set to its limit so that its pin 93 is resting on the arm of the bell crank 94. The first wheel 80 is then set at its first tooth so that after 99 cards have passed the passage of the 100th card will bring the first wheel round so that the pawl 82 drops into the deep tooth, thereby stepping the hundreds wheel forward by one step.

On release of the bell crank 94 (Fig. 8) the spring 104 attached thereto will return it to normal position, thereby moving the 100's wheel back one space to the position to which it was originally set. Further, the pawl will now again be in the first tooth of the first wheel so that the latter is also reset.

If the hundreds wheel is set at its first tooth and the first or units wheel is also set at its first tooth, the mechanism will be reset on release of the bell crank 94 after the passage of 1,000 cards.

If desired, two counters may also be operated from the member 72 which operates the counter for setting the punch slides 21. These two counters, of which one is shown at 115, are of the visual type and from them can be read off the number of cards which have been punched. Both these counters are actuated simultaneously once for each card, but one counter may be reset to zero after the passage of a group of cards so that it gives the total for each group, while the other counter is only reset after the passage of a number of groups and gives the grand total of all the groups.

In the construction described above the setting slides 21 are separate from the setting racks 39 and move up and down together with the punches 16.

If desired the invention may be applied to a machine having punching mechanism of the type described in the specification of A. Thomas' United States Patent No. 1,858,174 issued May 10, 1932.

In this form of mechanism the die plates between which the card is located for punching rise and fall with the card while the punches are normally stationary.

Mechanism according to the invention for setting punches of this type is illustrated in Figures 9 to 12 of the drawings.

In the construction illustrated in these figures the setting slides are formed integral with the setting racks as shown at 121 in Fig. 9. The slides 121 do not move up and down but are provided with rack teeth 122 to engage with the gear wheels 41.

The setting fingers in this case are in the form of pins 123 secured in sockets 124 at the ends of the slides 121.

The punches 16 rest freely by their heads 17 on a stationary plate 135 provided with perforations through which the punches pass.

Mounted between the tops of the punches 16 and the lower ends of the pins 123 is a stationary connection box including connection rods 126 which serve as interponents between the punches 16 and the setting fingers or pins 123. These interponent rods 126 are freely mounted in holes on plates 127, 128 forming part of the stationary connection box frame.

The plate 127 is provided with upstanding ribs 123a serving as guides for the setting fingers 123.

Mounted above the setting fingers 123 and fixed on the frame of the machine is an abutment plate 129 against the underside of which the upper ends of the setting fingers 123 abut.

With this arrangement when a card is located between the reciprocating die plates and the latter rise, the punches 16 will be lifted by the card. Any punch over which a setting finger 123 is disposed will be unable to rise, however, and consequently will perforate the card.

With this construction in which a card is moved up and down relatively to the punches the sensing of the presence or absence of a card may be carried out by the following mechanism.

Mounted below the die plates are feed rolls 131 which do not reciprocate with the die plates, and mounted in brackets 132 on the upper die plates is a pair of bell cranks 133 pivoted at 134 each carrying a feed roll 135, 135a. The upward arms of the bell cranks are connected by a spring 136 tending to cause the upper feed rolls 135, 135a to approach the lower feed rolls 131, slots 147 being provided in the die plates through which the feed rolls can pass.

The upward arm of one of the bell cranks 133 is extended at 137 and carries a pin 138 which can engage with a hook 139 on a link 140 which is connected to a latch 141 adapted to engage with a finger 142 secured to the shaft 73a which operates the pawl 45 to actuate the control counter for the punch setting slides. The latch 141 is pulled in a clockwise direction about its pivot 143 by a spring 144 and the link 140 is pulled in a clockwise direction by a spring 145 against a stop 146.

Figure 13:
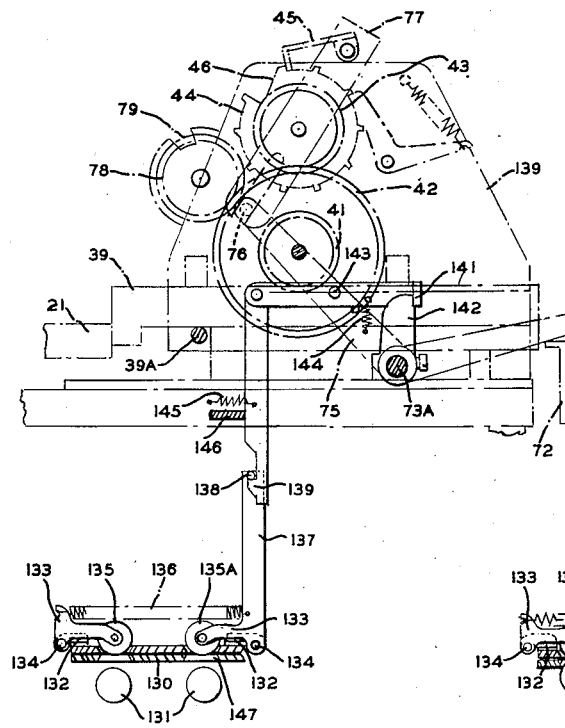
Figure 14:
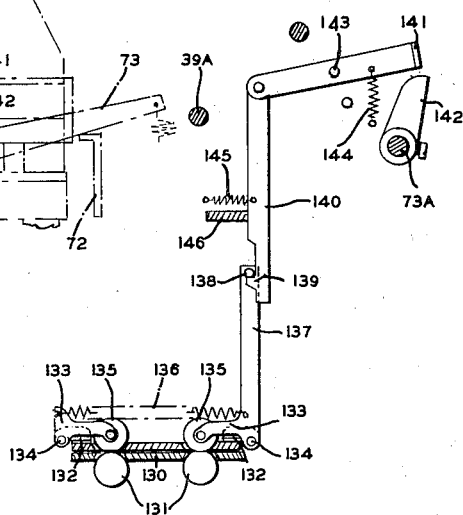
Figure 15:
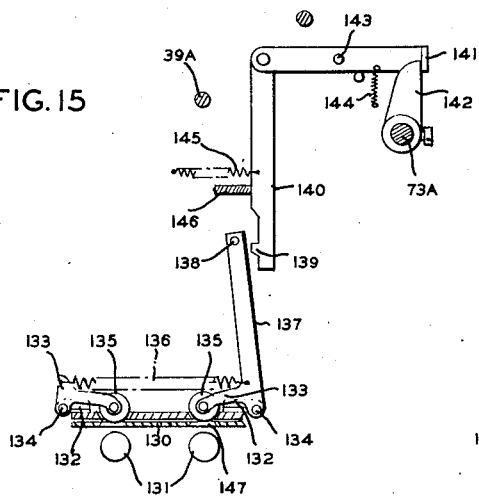

Fig. 13 shows the position of the parts when a card is between the die plates 130 and the die plates are in their raised position. Under these conditions the feed rolls 135, 135a are resting on the card and the pin 138 is in engagement with the hook 139, while the latch 141 is in engagement with the finger 142. When the pin plates descend the feed roll 135a resting on the card maintains the arm 137 in the same vertical plane and, therefore, the pin 138 pulls the link 140 downwardly, thereby lifting the latch 141 clear of the arm 142 as shown in Fig. 14. The spring 74 is, therefore, free to operate the pawl 45 when the member 72 is lowered.

After the card has been punched the die plates 130 rise again and the pin 138, acting on the inclined surface of the hook 139, swings the link 140 in a counter clockwise direction whereupon the parts again assume the position of Fig. 13.

The card is then ejected and if no further card is fed in, then, when the die plates rise from the position of Fig. 14 the spring 136 rocks the arm 137 in a counter-clockwise direction about its pivot 134 as the die plates rise, this rocking being permitted by the slots 147 which are cut in the die plates to receive the feed roll 135a. This swinging movement of the arm 137 brings the pin clear of the hook 139 so that the parts assume the position shown in Fig. 15, the latch 141 being re-engaged with the finger 142 by the action of the spring 144.

Figure 16:
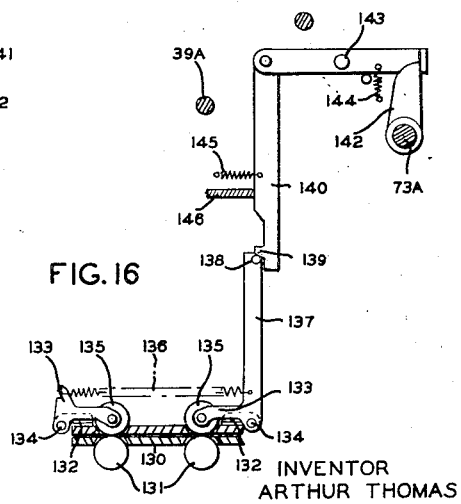

When the die plates 130 descend again the pin 138 passes under the hook 139 leaving it unaffected so that the latch 141 remains in engagement with the finger 142 holding the shaft 73a against rotation so that the spring 74 cannot actuate the pawl 45. The position of the parts when the die plates 130 are in their lower position and there is no card between them is shown in Fig. 16.

In Figs. 13 to 16 the link 140 has been shown directly pivoted to the latch member 141. The connection between the link 140 and the latch 141 may, however, comprise any suitable linkwork, the nature of which will depend upon the relative positions of the die plates 130 and the shaft 73a in the machine.

An alternative mechanism for operating the counter which sets the punches is illustrated in Fig. 12. In this construction a shaft 200 driven from the main shaft 3 carries a cam 201 serving to actuate a lever 202 pivoted between its ends at 203 and pulled into contact with the cam by a spring 204. The other end of the lever 202 engages an arm 205 secured to a shaft 206 carrying an arm 207 which is connected by a pin in slot connection 208 to a lever 209 on a shaft 210 which carries the actuating lever 211 for the pawl 45 which operates the ratchets 44 of the punch setting counting device.

What I claim is:—

1. A machine for making records on statistical cards comprising a plurality of denominational columns of punches, means for feeding cards into operative relation with said punches, a plurality of denominational setting slides, one for each column of punches, an abutment on each setting slide, a units counting device, means for advancing said counting device by one unit each time a card is fed into operative relation with the punches, an operative connection between each denominational element of said counter and the corresponding setting slide, said connection including a rack and a gear wheel, whereby the abutment on each denominational setting slide is operatively positioned with respect to that punch in the respective denominational column of punches which corresponds to the digit registered on the respective denominational element of the counting device, means for moving said punches and abutments relatively to a card whereby a punch with respect to which an abutment has been operatively positioned is forced through the card while the remaining punches rest on the card, and means for automatically returning each slide to zero position during the next operation of the units counter following the arrival of said slide at the nine position.

2. A machine according to claim 1 for making records on statistical cards wherein a gear wheel in each of the operative connections between the units counter and the setting slides operated by the units counter and one of said gear wheels is formed without teeth along that portion of its circumference which engages with the rack when the corresponding setting slide is moved beyond the nine position, said slide being pulled towards a zero stop by a spring so that when the slide is moved beyond the nine position it returns to zero under spring action.

3. A machine for making records in statistical cards, comprising a frame, means for reciprocating said frame towards and away from a card, a plurality of denominational punches freely mounted on said frame, a corresponding plurality of denominational punch setting slides carried by said frame so as to reciprocate therewith, a units counting device, means for advancing the counting device by one unit each time a card is fed into operative relation with the punches, an operative connection between each denominational element of said counting device and the corresponding setting slide, said connection including a rack and a gear wheel, whereby each denominational setting slide is positioned to serve as an abutment for that punch in the respective denominational column of punches which corresponds to the digit registered on the respective denominational element of the counting device, and means for automatically returning each setting slide to zero during the next operation of the units counter following the arrival of said slide at the nine position.

4. A machine according to claim 3 for making records in statistical cards wherein a gear wheel in each of the operative connections between the units counter and the setting slides is formed without teeth along that portion of its circumference which engages with the rack when the corresponding setting slide is moved beyond the nine position, said slide being pulled towards a zero stop by a spring so that when the slide is moved beyond the nine position it returns to zero under spring action.

5. A machine for making records on statistical cards comprising a plurality of columns of record forming elements, a plurality of denominational setting members for said record forming elements, a units counting device, means for feeding cards to said record forming elements, means for advancing said counting device by one unit each time a card is fed to the record forming elements, an operative connection between each setting member and the corresponding denominational element of the counting device whereby the setting members are positioned to set the record forming elements in accordance with the number registered in the counting device, a second units counter, means for disabling the card feeding mechanism when said second units counter has executed a predetermined number of steps, and means for simultaneously resetting said second units counter and re-establishing the card feed.

6. A machine according to claim 5 including a picker for feeding cards to the record forming elements wherein the means for disabling the card feeding mchanism operates to lift the cards clear of the picker.

7. In a record card perforating machine, the combination of a reciprocatory punch assembly comprising punch elements, restoring means therefor and longitudinally reciprocable punch setting means operable transversely to said assembly, an actuating rack for said setting means, card counting mechanism, and means responsive to the action of said card counting mechanism for causing said punch setting means to be set according to an increasing reading on said counting mechanism.

8. In a record card perforating machine, the combination of a reciprocatory punch assembly comprising punch elements, and setting slides, with actuating racks, counting mechanism arranged in denominational orders and capable of being advanced one unit for each card passing through the machine, and means comprising an operative connection between each setting slide and the mechanism of its associated denominational order for advancing said actuating racks one step for each digit increase in the said counter reading.

9. In a record card perforating machine, the combination of a reciprocatory punch assembly, setting slides therefor, actuating racks for said setting slides, counting mechanism arranged in denominational orders and responsive to the passing of said record cards, and means arranged in denominational orders comprising an operative connection between each setting slide and said counting mechanism for advancing said racks according to the digit by digit increase in the reading of said counting mechanism.

10. In a record card perforating machine the combination of card storage means, card feeding means, an assembly of punches, a units counter, means for controlling said punches according to the digital advance of said counter, and means associated with said punch assembly for preventing the advance of said counter.

ARTHUR THOMAS.